United States Patent [19]

Uno et al.

[11] 4,051,503
[45] Sept. 27, 1977

[54] EXPOSURE DISPLAY DEVICE FOR A SINGLE LENS REFLEX CAMERA

[75] Inventors: Nayuki Uno, Urawa; Tetsuji Shono, Ranzan; Fumio Urano, Omiya; Masahiro Kawasaki; Katsuhiko Miyata, both of Saitama, all of Japan

[73] Assignee: Asahi Kogaku Kogyo Kabushiki Kaisha, Tokyo, Japan

[21] Appl. No.: 612,945

[22] Filed: Sept. 12, 1975

[30] Foreign Application Priority Data

Sept. 30, 1974  Japan .......................... 49-118012[U]

[51] Int. Cl.$^2$ .................... G03B 17/00; G03B 17/20
[52] U.S. Cl. .................................. 354/289; 354/39; 354/53; 354/57; 354/60 L; 354/61
[58] Field of Search .............. 354/23 R, 36, 39, 53, 354/54, 55, 56, 57, 60 R, 60 EI, 60 L, 61, 289; 116/114 J, 114 R; 350/160 LC; 356/228, 229; 340/379 R, 378 A, 379

[56] References Cited

U.S. PATENT DOCUMENTS

| | | |
|---|---|---|
| 2,948,259 | 8/1960 | Frost et al. ............... 356/227 |
| 3,289,025 | 11/1966 | Bullinger ............... 340/378 A |
| 3,700,337 | 10/1972 | Fujii et al. ............... 356/227 |
| 3,727,527 | 4/1973 | Borowski et al. ............ 354/53 |
| 3,812,503 | 5/1974 | Engelsmann et al. ......... 354/60 L |
| 3,818,495 | 6/1974 | Sagara et al. ............. 354/60 L |
| 3,820,132 | 6/1974 | Lindner .................. 354/53 |
| 3,835,465 | 9/1974 | Tannas, Jr. et al. ........ 340/378 R |
| 3,868,704 | 2/1975 | Yamoda et al. ............. 354/60 A |
| 3,895,875 | 7/1975 | Kitaura et al. ............ 354/53 |

FOREIGN PATENT DOCUMENTS

| | | | |
|---|---|---|---|
| 1,275,454 | 5/1972 | United Kingdom ............ 354/53 |
| 1,300,914 | 12/1972 | United Kingdom ............ 354/53 |

*Primary Examiner*—Russell E. Adams
*Attorney, Agent, or Firm*—Christensen, O'Connor, Garrison & Havelka

[57] ABSTRACT

An exposure display device for a single lens reflex camera including light display elements for displaying either shutter speed or diaphragm value is disclosed. Nominal values representing either shutter speed or diaphragm value are marked on a glass plate disposed in the vicinity of the focusing plate of the camera's viewfinder. A first display section, comprising a first set of light display elements aligned with (and, if desired, located inbetween) the nominal values, creates a first exposure component (e.g. diaphragm value or shutter speed) display whose value is related to predetermined exposure conditions, such as object brightness, film sensitivity and the other exposure component (e.g. shutter speed or diaphragm value). A second display section, comprising a second set of light display elements, also aligned with the nominal values, creates a second display of the exposure component chosen to be displayed. The second display represents the actual position of the camera element controlling the displayed exposure component.

10 Claims, 6 Drawing Figures

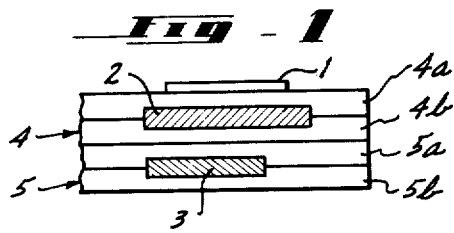
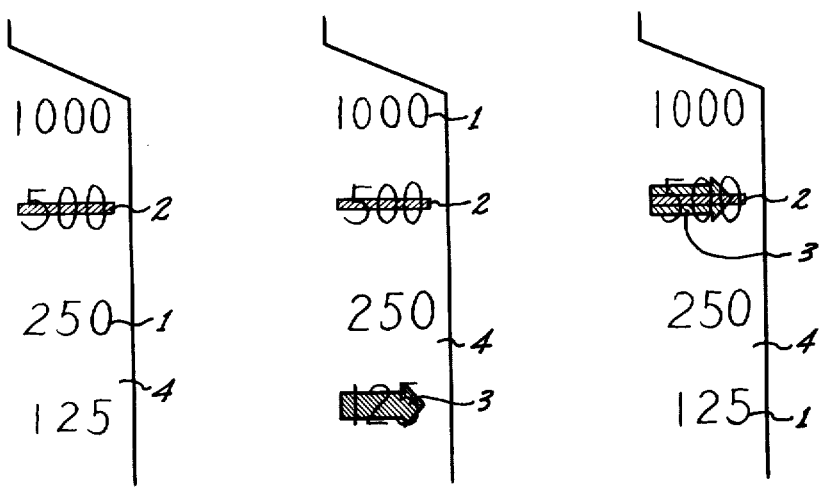
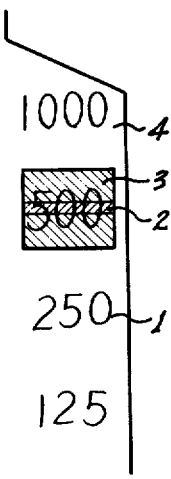
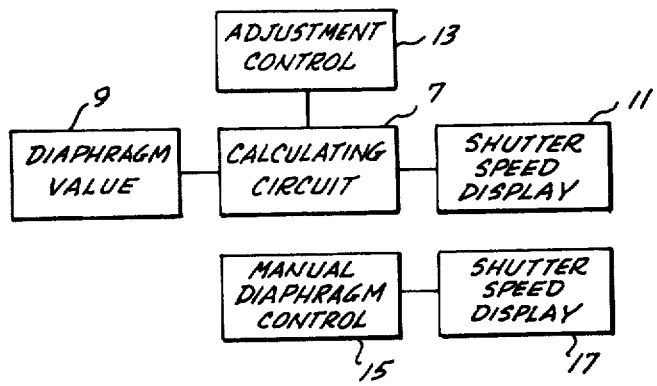

EXPOSURE DISPLAY DEVICE FOR A SINGLE LENS REFLEX CAMERA

BACKGROUND OF THE INVENTION

This invention is directed to display devices and, more particularly, to exposure display devices for single lens reflex cameras.

In general, two interrelated exposure components are involved in single lens reflex cameras, one or both of which may be displayed in the viewfinder of the camera. These exposure components are normally referred to as shutter speed and diaphragm value (f-stop). In single lens reflex cameras, regardless of whether or not they are manually controlled or automatically controlled, one of these components is preadjusted. This preadjustment informtion, plus information about the brightness of the object to be photographed and film sensitivity, defines the value of the other exposure component. For example, if the diaphragm value is preadjusted, then shutter speed is determined by the preadjustment value, object light and film sensitivity. In an automatic camera, the shutter speed is automatically set by the camera's electronic system in accordance with these parameters. In many manually adjusted cameras (or the manual mode of automatic cameras), a viewfinder display informs the operator of the necessary shutter speed adjustment and he adjusts the shutter speed accordingly. Conversely to the foregoing, if shutter speed is preadjusted, then diaphragm value is controlled and/or displayed.

In the past, a variety of methods and apparatus for displaying exposure information in the viewfinder of a single lens reflex camera have been proposed and used. These prior art methods and apparatus can be classified in two broad groups — an analog group and a digital group. The analog group utilizes analog techniques and usually employs an ammeter whose needle position is controlled in accordance with information received by the camera. The digital group utilizes digital techniques and employs solid state display elements for displaying exposure information. Each group has its merits and demerits and an ultimate conclusion cannot be reached about which of these groups is superior to the other group. In this regard, the needle of an ammeter is not extremely rigid, making exposure devices using ammeters somewhat unreliable. Further, ammeter display devices are the source of a major portion of camera disorders. Moreover, ammeter display devices are not particularly suitable for use in cameras with automatic exposure control devices having wide exposure ranges, because their display range is limited to the maximum deflection angle of the ammeter needle. A still further disadvantageis that, because ammeter structures are relatively voluminous and occupy a large space within a camera housing, they prevent the formation of compact cameras.

In order to overcome the disadvantages of ammeter exposure display systems, a full-digital display has recently been proposed for inclusion in single lens reflex cameras. However, such systems present other problems. One of the major problems or disadvantages of digital display systems is their requirement for a relatively complicated large circuit when it is desired to provide displays for all currently employed shutter speeds. Another difficulty with digital display systems is the requirement that the operator of the camera be re-educated. That is, camera users are generally accustomed to conventional analog display systems employing an ammeter structure. In order for them to utilize digital displays, they must be re-educated. Re-education is necessary because it is essentially impossible to make the digital displays large enough to be easily viewed and because the display numerals vary frequently and hastily from one value to another value, whereby users have found it difficult to read out the required EV (exposure value).

Therefore, it is an object of this invention to provide a new and improved exposure display device.

It is a further object of this invention to provide a new and improved exposure display device for single lens reflex cameras.

It is another object of this invention to provide a new and improved exposure display device for single lens reflex cameras that eliminates many of the disadvantages of ammeter display systems, yet retains many of their advantages.

It is a still further object of this invention to provide a new and improved exposure display device for single lens reflex cameras that eliminates many of the disadvantages of digital display devices, yet retains many of their advantages.

It is yet another object of this invention to provide an exposure display device for single lens reflex cameras that incorporates many of the advantages of both analog display devices and digital display devices while eliminating many of the disadvantages of both devices.

SUMMARY OF THE INVENTION

In accordance with principles of this invention, an exposure display device for a single lens reflex camera is provided. The exposure display device of the invention is useful with either automatic or manually adjustable single lens reflex cameras and includes light display elements for displaying either shutter speed or diaphragm value, as desired. In one form, nominal values representing either shutter speed or diaphragm value are marked on a glass plate disposed in the vicinity of the focusing plate of the camera's viewfinder. A first display section, comprising a first set of light display elements aligned with the nominal values, create a first display. In the case of an automatic camera, the displayed exposure component represents the position of the related element automatically set by the camera's electronic control system. In a manually adjusted camera, the displayed exposure component informs the operator of the necessary adjustment to make before operating the camera. In addition to the first display section, a second display section is also provided. The second display section comprises a second set of light display elements also aligned with the nominal values. In a manually adjusted camera (or the manual mode of an automatic camera) the second set of light display elements creates a second display representing the actual position of the camera elements controlling the displayed exposure component. By adjusting these camera elements, the camera can be adjusted such that the required shutter speed or diaphragm value, as the case may be, can be set, at which point both displays indicate the same value.

In accordance with further principles of this invention, the light display elements are liquid crystal display elements sandwiched in glass plates so as to be aligned with the nominal values. Further, additional light display elements can be positioned in between the nominal values, if desired.

Because both sets of light display elements are superimposed over the nominal values, the size of the overall display is decreased. More specifically, rather than disposing the display elements beside nominal values representing shutter speeds (or diaphragm values) and, thereby, creating a display requiring a large space (which may intrude on the viewfinder frame), the superimposition of the display light decreases the size of the display without decreasing the size of the nominal values. This result is achieved because an ordinary DSM (dynamic scattering method) system employing liquid crystals has a transmission factor of more than 90% under nonoperating conditions. Thus, an object disposed behind a liquid crystal can be clearly seen through it, even when two separate liquid crystals are superimposed in piles. Furthermore, the operation (energization) of two superimposed liquid crystals can be readily viewed, particularly if they are either different in size or, more preferably, display selected different display patterns and/or colors.

It will be appreciated the invention overcomes the disadvantages of ammeter display mechanisms while retaining the benefits of such systems. That is, the present invention provides an exposure display that is, visually, as good as the exposure display given by an ammeter system, without requiring the inclusion of an ammeter mechanism. Further, it includes the benefits of a digital system without including the detriments of prior art digital type systems.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is an enlarged sectional view illustrating an exposure display device formed in accordance with the invention;

FIG. 2 is an automatic camera display formed in accordance with the invention;

FIG. 3 is a manual camera display formed in accordance with the invention wherein the position of the camera system controlling the displayed exposure component is not at the desired position;

FIG. 4 is a manual camera display formed in accordance with the invention wherein the position of the camera system controlling the displayed exposure component is at the desired position;

FIG. 5 is a manual camera display formed in accordance with the invention similar to that illustrated in FIG. 4 wherein the display is formed in a different manner; and, FIG. 6 is a block diagram used to explain the basic principles of the exposure display device of the invention.

DESCRIPTION OF THE PREFERRED EMBODIMENTS

FIG. 1 is a sectional diagram of an exposure display section formed in accordance with the invention. Preferably, the exposure display section is arranged at the right end of the viewfinder of a camera; however, it can be arranged in other positions. FIG. 1 includes: a plurality of nominal values 1 (located transverse to the section); a first display section comprising a first set of liquid crystal display elements 2; and, a second display section comprising a second set of liquid crystal display elements 3. The first set of liquid crystal display elements 2 are sandwiched in a first glass plate 4 formed of two sections 4a and 4b and the second set of liquid crystal display elements 3 are sandwiched in an adjacent glass plate 5 formed of two sections 5a and 5b.

The nominal values 1 may be diaphragm values or shutter speeds — the coice being determined by the type of camera. For example, in the so-call diaphragm priority type camera in which, when photographing an object, the photographer adjusts the lens diaphragm value before setting the shutter speed, the nominal values represent shutter speed. This type of camera system is illustrated in the drawings and hereinafter described. In the other type of camera system, the so-call shutter speed priority type camera wherein shutter speed is set before diaphragm value is set, diaphragm value would be displayed, rather than shutter speed.

Regardless of the type of camera involved, the nominal values 1 are marked in a row on the exposed side of the first glass plate 4. They may be etched in the glass plate, painted thereon or in some other manner arranged so as to be viewable through the first and second glass plates 4 and 5. The first set of liquid crystal display elements 2 are at least equal in number to the nominal values 1 and aligned therewith. More specifically, as illustrated in FIGS. 1 and 2–5, the first set of liquid crystal display elements 2, sealed in the glass plate 4, are mounted such that one such element is in alignment with each of the nominal values 1. As will be better understood from the following description, this set of liquid crystal display elements act as exposure display members and correspond to the main ammeter needle in prior art ammeter exposure display devices.

The second set of liquid crystal display elements 3, sealed in the second glass plate 5, are also aligned with the nominal values 1 on a one-to-one basis. In FIG. 1, the second set of liquid crystal display elements 3 are positioned below the first set of liquid crystal display elements 2 and both are placed immediately below the nominal values related to shutter speed. The second set of liquid crystal display elements are associated with the shutter dial of the camera, whereby they indicate the value of the manual adjustment of the shutter. Thus, the second set of liquid crystal display elements have a function similar to the follower needle of prior art exposure display devices.

It should be noted, and is pointed out here that the number of liquid crystal display elements making up either or both of the first and second display sections could, if desired, be greater than the number of nominal values. These "additional" liquid crystal display elements can be positioned inbetween the nominal values to provide "inbetween" indications.

Prior to discussing the embodiments of the invention illustrated in FIGS. 2–5 displays, the basic principles of camera display systems are described with reference to FIG. 6. As is well known to those skilled in the art, camera exposure display systems include an arithmetic unit in the form of an electronic calculating circuit 7. The calulating circuit receives information from a position sensor which represents the preadjusted value of one exposure component i.e., either diaphragm value or shutter speed. In this regard, FIG. 6 illustrates a diaphragm value sensor 9, which provides information related to diaphragm value. The calculating circuit 7 also receives information related to the sensitivity of the film and the exposure conditions, e.t., brightness of the object to be photographed. In accordance with this information, the calculating circuit 7 generates an output signal that is used to control a shutter speed display 11. (Contrawise, if the position sensor senses shutter speed rather than diaphragm value, then the display 11 is a diaphragm value display.) If the camera is to be manually adjusted, the photographer then adjusts the camera's shutter speed in accordance with the displayed information. Contrawise, if the camera is an automatic camera, the calculating circuit 7 controls an adjustment control 13 that automatically sets shutter speed.

The other two blocks illustrated in FIG. 6 comprise a manual diaphragm control 15 and a shutter speed display and represent that when diaphragm value is manually pre-set as the adjusting condition, the adjustment controls a display of shutter speed (or vice versa if shutter speed is pre-set). In this manner a display illustrating the necessary camera adjustment is formed.

Turning now to FIGS. 2-5, these figures illustrate examples of exposure value display patterns formed in accordance with the invention and displayed in the viewfinder of a camera. While the displays can be displayed at various positions in the viewfinder, as will be appreciated by those skilled in the art, they are usually displayed at the right end of the viewfinder display.

FIG. 2 illustrates a display pattern created in a camera wherein shutter speed is adjusted automatically. In such an environment, only the appropriate one of the first set of liquid crystal display elements 2 is energized. In the particular display illustrated in FIG. 2, the liquid crystal display element associated with the display 500 (which represents a shutter speed of 1/500 sec.) is energized. Thus, this display illustrates that for the preadjustment position of the diaphragm value and film speed and the existing photographic conditions, the shutter speed has been automatically adjusted for 1/500 sec.

It will be appreciated that if the photographic conditions (e.g. object light) changes, the display will change (as well as the automatically controlled shutter speed). In this regard, like an ammeter needle, the indication created by the liquid crystal display elements 2 will move up or down in the view finder in accordance with the variation in the brightness of the object. Similarly if the pre-set film sensitivity or diaphragm value are changed, the display will change.

FIG. 3 illustrates the type of display formed in a camera wherein shutter speed is manually adjusted. In this display a liquid crystal display element from each set of liquid crystal display elements is energized. In this regard, the first set of liquid crystal display elements 2 function similar to the main or exposure meter needle of an ammeter system and the second set of liquid crystal display elements function similar to the follower needle (which indicates the value of the adjusted shutter speed) of such a system. In the display illustrated in FIG. 3, the energized liquid crystal display element of the first set 2, corresponding to the exposure meter needle, indicates the numeral 500, which represents a shutter speed of 1/500 second. Thus, the preadjusted diaphragm value and other sensed information (film speed and object brightness) indicate that the shutter speed should be set at 1/500 sec. Contrary to this setting, the ignited liquid crystal display element of the second set 3, corresponding to the follower needle, indicates the numeral 125, which represents a shutter speed setting of 1/125 sec. Since the set shutter speed is incorrect the operator must adjust the camera. This is done by changing the shutter speed from 1/125 to 1/500 sec. When this step has been preformed, the display created by the second set of liquid crystal display elements 3 will move up and the display illustrated in FIG. 4 will occur. In this position, the adjusted position, corresponding to the follower needle, is brought into line with the display position corresponding to the exposure meter main needle. Conversely, depending upon photographic conditions, the indication created by the ignited one of the first set of liquid crystal display elements 2 may be brought in line with the indication created by the ignited one of the second set of liquid crystal display elements 3 by adjusting the diaphragm value.

FIG. 5 illustrates a modification of the indication pattern illustrated in FIGS. 3 and 4. More specifically, in FIGS. 3 and 4, the first set of liquid crystal display elements are in the form of lines or bars and the second set of liquid crystal display elements 3, in the form of somewhat larger arrows. The display elements of each set may or may not create the same color liquid crystal displays. In FIG. 5, the second set of liquid crystal display elements are in the form of blocks large enough to cover an entire nominal value 1. In addition, preferably, they create different colored displays and/or patterns when compared to the first set of liquid crystal display elements.

It should be noted that an important feature of the present invention lies in the use of two separate groups of liquid crystal display elements superimposed over nominal values. As noted above, identical liquid crystal display elements having an identical pattern and/or color can be utilized if desired. However, such utilization is not preferred because the different displays will be difficult to distinguish between. Thus, misunderstandings of the displays will readily occur. Therefore, it is preferable (also as noted above), and an important feature of the invention, to include groups of liquid crystal display elements having different patterns and/or colors.

It will be appreciated from the foregoing description that the invention provides a new and improved exposure display device for a single lens reflex camera. The display device can be utilized in a camera that has automatic exposure control to indicate either diaphgram value or shutter speed when the camera is in automatic mode of operation. The invention is also used in an automatic exposure control camera, when the camera is in its manual state of operation, to provide information necessary to manually adjust the camera. Alternatively, the invention can be utilized in an entirely manually controlled camera.

While a preferred embodiment of the invention has been illustrated and described, it will be appreciated that various changes can be made therein without departing from the spirit and scope of the invention. Hence, the invention can be practiced otherwise than as specifically described herein.

The embodiments of the invention in which an exclusive property or privilege is claimed are defined as follows:

1. A digital type exposure display device for a single lens reflex camera comprising:
   a nominal value display including a transparent support member and a series of nominal values marked thereon, each of said nominal values being related to an exposure component of a photography system;
   a first set of selectively energizable light display elements at least equal in number to the number of nominal values marked on said transparent support, each of said light display elements having an optical characteristic that changes when a suitable voltage is applied to said light display element, said first set of selectively energizable light display elements and said transparent support being superimposed such that one of said first set of selectively energizable light display elements is associated with each of said nominal values so that the selective energization of one of said first set of selectively energizable light display elements causes a first display of a related one of said nominal values; and, a second set of selectively energizable light display elements at least equal in number to the number of nominal values marked on said transparent support, each of said light display elements having an optical characteristic that changes when a suitable voltage is applied to said light display element, said second set of selectively energizable light display elements and said first set of selectively energizable light display elements being superimposed such that one element on said second set of selectively energizable light display elements is associated with each of said nominal values so that the selective energization of one of said second set of selectively energizable light display elements causes a second display of a related one of said nomilnal values.

2. The exposure display device claimed in claim 1 wherein:
1. said nominal values represent shutter speed;
2. said first set of light display elements create a display related to a predetermined set of photographic parameters not including manually set shutter speed; and,
3. said second set of light display elements create a display related to manually set shutter speed.

3. An exposure display device as claimed in claim 2 wherein said first and second sets of light display elements are liquid crystal display elements.

4. An exposure display device as claimed in claim 3 wherein said liquid crystal display elements have different color characteristics.

5. An exposure display device as claimed in claim 3 wherein said liquid crystal display elements have different light ray pattern characteristics.

6. 6 An exposure display device as claimed in claim 3 wherein the displays created by said first and second sets of liquid crystal display elements are different in size.

7. An exposure display device as claimed in claim 1 wherein said first and second sets of light display elements are liquid crystal display elements.

8. An exposure display device as claimed in claim 7 wherein said liquid crystal display elements have different color characteristics.

9. An exposure display device as claimed in claim 7 wherein said liquid crystal display elements have different light ray pattern characteristics.

10. An exposure display device as claimed in claim 7 wherein the displays created by said first and second sets of liquid crystal display elements are different in size.

* * * * *